(12) United States Patent
Park et al.

(10) Patent No.: US 12,340,718 B2
(45) Date of Patent: Jun. 24, 2025

(54) ELECTRONIC DEVICE TESTING METHOD

(71) Applicant: Samsung Display Co., LTD., Yongin-si (KR)

(72) Inventors: Jinwoo Park, Yongin-si (KR); Bogeun Yuk, Yongin-si (KR); Taejoon Kim, Yongin-si (KR); Seungrok Lee, Yongin-si (KR); Il Ho Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 216 days.

(21) Appl. No.: 18/199,606

(22) Filed: May 19, 2023

(65) Prior Publication Data

US 2024/0046827 A1 Feb. 8, 2024

(30) Foreign Application Priority Data

Aug. 4, 2022 (KR) .................. 10-2022-0097527

(51) Int. Cl.
*G09G 3/00* (2006.01)
*G06F 3/044* (2006.01)
*G09G 3/20* (2006.01)

(52) U.S. Cl.
CPC ........... *G09G 3/006* (2013.01); *G06F 3/0446* (2019.05); *G09G 3/2096* (2013.01); *G09G 2330/12* (2013.01)

(58) Field of Classification Search
CPC .. G09G 3/006; G09G 3/2096; G09G 2330/12; G09G 2300/0426; G06F 3/0446; G01R 31/2837; G01R 19/0053; G01R 27/2605; G01R 31/2825; G01R 31/31709
See application file for complete search history.

(56) References Cited

U.S. PATENT DOCUMENTS

| 2011/0102353 A1 | 5/2011 | Kim et al. | |
| 2014/0353666 A1* | 12/2014 | Lee | H01L 22/32 257/71 |
| 2015/0015823 A1* | 1/2015 | Lo | G09G 3/006 438/29 |

(Continued)

FOREIGN PATENT DOCUMENTS

| JP | 6342695 B2 | 6/2018 |
| KR | 100957836 B1 | 5/2010 |
| KR | 101935432 B1 | 1/2019 |

*Primary Examiner* — Alvaro E Fortich
(74) *Attorney, Agent, or Firm* — CANTOR COLBURN LLP

(57) ABSTRACT

An electronic device testing method includes providing an electronic device including a display layer including a common electrode and a sensor layer that is disposed on the display layer and that includes a plurality of first electrodes and a plurality of second electrodes that insulatively intersect the plurality of first electrodes, measuring a plurality of jitter values of a plurality of channels formed by the plurality of first electrodes and the plurality of second electrodes, calculating a first value being an average of the plurality of jitter values, calculating a second value by summing jitter values, among the plurality of jitter values, of channels formed by one of the plurality of second electrodes among the plurality of channels, and testing the common electrode based on a third value obtained by dividing the second value by the first value.

20 Claims, 10 Drawing Sheets

(56) References Cited

U.S. PATENT DOCUMENTS

| | | |
|---|---|---|
| 2015/0301653 A1 | 10/2015 | Urushi |
| 2016/0195740 A1* | 7/2016 | Jeon ...................... G02F 1/1309 |
| | | 324/760.01 |
| 2019/0369795 A1* | 12/2019 | Chen ................... G06F 3/04184 |
| 2022/0253168 A1* | 8/2022 | Kang .................. G06F 3/04164 |

* cited by examiner

FIG. 10

| | Tx15 | Tx14 | Tx13 | Tx12 | Tx11 | Tx10 | Tx9 | Tx8 | Tx7 | Tx6 | Tx5 | Tx4 | Tx3 | Tx2 | Tx1 | Tx0 | V2 | V3 |
|---|---|---|---|---|---|---|---|---|---|---|---|---|---|---|---|---|---|---|
| Rx35 | 2 | 3 | 12 | 9 | 11 | 7 | 7 | 9 | 19 | 12 | 4 | 15 | 12 | 5 | 9 | 6 | 142 | 33.94 |
| Rx34 | 2 | 2 | 8 | 3 | 17 | 6 | 5 | 8 | 19 | 16 | 3 | 12 | 13 | 12 | 11 | 6 | 143 | 36.59 |
| Rx33 | 2 | 3 | 14 | 6 | 11 | 7 | 4 | 8 | 21 | 12 | 3 | 19 | 9 | 5 | 12 | 8 | 144 | 40.07 |
| Rx32 | 2 | 2 | 5 | 3 | 8 | 5 | 3 | 6 | 10 | 9 | 3 | 8 | 6 | 7 | 7 | 3 | 87 | 26.91 |
| Rx31 | 2 | 3 | 4 | 3 | 4 | 3 | 3 | 3 | 8 | 6 | 2 | 8 | 3 | 3 | 4 | 2 | 61 | 19.83 |
| Rx30 | 2 | 1 | 3 | 2 | 2 | 2 | 2 | 3 | 5 | 3 | 1 | 3 | 2 | 3 | 4 | 3 | 41 | 13.58 |
| Rx29 | 2 | 2 | 2 | 2 | 3 | 3 | 2 | 2 | 7 | 3 | 3 | 3 | 3 | 3 | 3 | 3 | 46 | 15.05 |
| Rx28 | 2 | 2 | 2 | 2 | 4 | 3 | 2 | 2 | 6 | 3 | 2 | 2 | 3 | 4 | 2 | 3 | 44 | 14.31 |
| Rx27 | 2 | 3 | 3 | 3 | 3 | 2 | 3 | 3 | 9 | 3 | 3 | 3 | 3 | 3 | 3 | 3 | 49 | 15.77 |
| Rx26 | 2 | 2 | 4 | 2 | 7 | 3 | 3 | 4 | 7 | 4 | 2 | 4 | 5 | 6 | 3 | 2 | 59 | 18.96 |
| Rx25 | 2 | 2 | 3 | 3 | 3 | 3 | 2 | 3 | 11 | 4 | 2 | 3 | 2 | 3 | 3 | 3 | 55 | 18.10 |
| Rx24 | 2 | 2 | 4 | 3 | 5 | 3 | 3 | 4 | 8 | 4 | 4 | 5 | 5 | 6 | 4 | 2 | 58 | 19.45 |
| Rx23 | 3 | 3 | 3 | 3 | 3 | 3 | 2 | 3 | 5 | 4 | 3 | 3 | 3 | 3 | 3 | 4 | 54 | 18.78 |
| Rx22 | 2 | 2 | 3 | 2 | 5 | 3 | 3 | 2 | 5 | 3 | 2 | 3 | 3 | 4 | 4 | 3 | 54 | 19.46 |
| Rx21 | 2 | 2 | 3 | 4 | 3 | 3 | 2 | 2 | 3 | 2 | 3 | 3 | 2 | 2 | 2 | 2 | 42 | 16.00 |
| Rx20 | 2 | 2 | 2 | 2 | 4 | 3 | 2 | 2 | 3 | 2 | 2 | 3 | 2 | 2 | 3 | 3 | 40 | 15.24 |
| Rx19 | 2 | 2 | 3 | 4 | 3 | 3 | 2 | 3 | 3 | 3 | 3 | 3 | 3 | 4 | 3 | 3 | 43 | 16.00 |
| Rx18 | 2 | 2 | 3 | 2 | 3 | 3 | 2 | 3 | 3 | 3 | 2 | 3 | 3 | 2 | 3 | 4 | 43 | 16.00 |

| | Tx15 | Tx14 | Tx13 | Tx12 | Tx11 | Tx10 | Tx9 | Tx8 | Tx7 | Tx6 | Tx5 | Tx4 | Tx3 | Tx2 | Tx1 | Tx0 | V2 | V3 |
|---|---|---|---|---|---|---|---|---|---|---|---|---|---|---|---|---|---|---|
| Rx35 | 3 | 3 | 2 | 2 | 2 | 2 | 2 | 3 | 2 | 2 | 2 | 3 | 3 | 2 | 3 | 2 | 38 | 14.27 |
| Rx34 | 8 | 15 | 12 | 12 | 14 | 17 | 12 | 14 | 11 | 10 | 13 | 15 | 10 | 9 | 17 | 9 | 198 | 73.88 |
| Rx33 | 3 | 4 | 3 | 3 | 2 | 2 | 3 | 3 | 3 | 3 | 3 | 4 | 4 | 3 | 3 | 3 | 49 | 23.62 |
| Rx32 | 2 | 2 | 3 | 2 | 3 | 3 | 2 | 3 | 2 | 3 | 3 | 2 | 2 | 3 | 2 | 2 | 38 | 18.92 |
| Rx31 | 2 | 2 | 2 | 2 | 2 | 2 | 2 | 2 | 2 | 2 | 2 | 2 | 2 | 3 | 2 | 2 | 32 | 16.14 |
| Rx30 | 1 | 2 | 1 | 1 | 2 | 2 | 2 | 2 | 1 | 2 | 2 | 2 | 2 | 2 | 1 | 2 | 30 | 15.15 |
| Rx29 | 2 | 1 | 2 | 2 | 3 | 2 | 2 | 2 | 2 | 2 | 2 | 3 | 2 | 2 | 1 | 2 | 30 | 15.08 |
| Rx28 | 2 | 2 | 2 | 1 | 2 | 2 | 3 | 2 | 2 | 2 | 2 | 2 | 2 | 2 | 2 | 1 | 30 | 15.50 |
| Rx27 | 3 | 2 | 2 | 2 | 2 | 2 | 2 | 2 | 2 | 2 | 2 | 2 | 2 | 2 | 2 | 2 | 31 | 16.45 |
| Rx26 | 1 | 3 | 3 | 2 | 2 | 2 | 2 | 3 | 1 | 2 | 2 | 1 | 2 | 2 | 2 | 2 | 33 | 15.00 |
| Rx25 | 1 | 2 | 2 | 2 | 2 | 2 | 2 | 2 | 2 | 2 | 2 | 2 | 2 | 2 | 1 | 2 | 30 | 14.88 |
| Rx24 | 1 | 3 | 2 | 3 | 2 | 2 | 2 | 2 | 2 | 2 | 2 | 2 | 1 | 2 | 2 | 2 | 30 | 15.72 |
| Rx23 | 3 | 4 | 3 | 2 | 2 | 3 | 3 | 3 | 2 | 2 | 2 | 2 | 2 | 2 | 3 | 2 | 32 | 16.65 |
| Rx22 | 2 | 2 | 2 | 2 | 2 | 2 | 2 | 2 | 2 | 2 | 2 | 2 | 2 | 2 | 2 | 2 | 34 | 17.78 |
| Rx21 | 2 | 1 | 2 | 2 | 2 | 2 | 2 | 2 | 2 | 2 | 2 | 2 | 2 | 2 | 2 | 2 | 36 | 16.25 |
| Rx20 | 2 | 2 | 2 | 2 | 2 | 2 | 2 | 2 | 2 | 2 | 2 | 2 | 2 | 2 | 2 | 2 | 32 | 16.34 |
| Rx19 | 2 | 2 | 2 | 2 | 2 | 2 | 2 | 2 | 2 | 2 | 2 | 2 | 2 | 2 | 2 | 1 | 31 | 16.00 |
| Rx18 | 2 | 2 | 2 | 2 | 2 | 2 | 2 | 2 | 2 | 2 | 2 | 2 | 2 | 1 | 2 | 2 | 31 | 16.00 |

JV (Rx35, Tx15)

ELECTRONIC DEVICE TESTING METHOD

This application claims priority to Korean Patent Application No. 10-2022-0097527, filed on Aug. 4, 2022, and all the benefits accruing therefrom under 35 U.S.C. § 119, the content of which in its entirety is herein incorporated by reference.

BACKGROUND

1. Field

Embodiments of the disclosure described herein relate to an electronic device testing method having improved reliability.

2. Description of the Related Art

An electronic device used in a smart phone, a television, a monitor, or the like includes various elements such as a display layer including a common electrode and a sensor layer. In order to secure reliability of the elements, a procedure for verifying operational characteristics of the elements and an electrical connection relationship between the elements is desired in development and manufacturing processes.

SUMMARY

Embodiments of the disclosure provide an electronic device testing method having improved reliability.

In an embodiment, an electronic device testing method includes providing an electronic device including a display layer including a common electrode and a sensor layer that is disposed on the display layer and that includes a plurality of first electrodes and a plurality of second electrodes that insulatively intersect the plurality of first electrodes, measuring a plurality of jitter values of a plurality of channels formed by the plurality of first electrodes and the plurality of second electrodes, calculating a first value being an average of the plurality of jitter values, calculating a second value by summing jitter values, among the plurality of jitter values, of channels formed by one of the plurality of second electrodes among the plurality of channels, and testing the common electrode based on a third value obtained by dividing the second value by the first value.

In an embodiment, the testing the common electrode may include determining that the common electrode is defective, when the third value is greater than a predetermined value.

In an embodiment, the testing the common electrode may further include determining that the common electrode is a good product, when the third value is smaller than the predetermined value.

In an embodiment, the predetermined value may be 50.

In an embodiment, each of the plurality of flitter values may have a value of 1 to 25.

In an embodiment, the testing the common electrode may include determining whether the common electrode has been unformed.

In an embodiment, the display layer may further include a plurality of data lines.

In an embodiment, the electronic device testing method may further include providing a white signal to the plurality of data lines.

In an embodiment, the providing the white signal may be provided between the providing the electronic device and the measuring the plurality of jitter values.

In an embodiment, the plurality of first electrodes may include a plurality of sensing patterns arranged in a first direction and a connecting pattern that connects two sensing patterns adjacent to each other among the plurality of sensing patterns, and the plurality of second electrodes may include a plurality of first portions arranged in a second direction crossing the first direction and a second portion that connects two first portions adjacent to each other among the plurality of first portions.

In an embodiment, the connecting pattern and the second portion may be disposed in different layers.

In an embodiment, the measuring the plurality of jitter values may include providing a test signal to the plurality of first electrodes, sensing mutual capacitance from the plurality of second electrodes, and sensing the plurality of jitter values based on the mutual capacitance.

In an embodiment, an electronic device testing method includes providing an electronic device including a display layer including a common electrode and a plurality of data lines and a sensor layer that is disposed on the display layer and that includes a plurality of first electrodes and a plurality of second electrodes that insulatively intersect the plurality of first electrodes, measuring a plurality of jitter values of a plurality of channels formed by the plurality of first electrodes and the plurality of second electrodes, calculating a first value based on the plurality of jitter values, calculating a second value by summing jitter values, among the plurality of jitter values, of channels formed by one of the plurality of second electrodes among the plurality of channels, and determining whether the common electrode has been unformed, based on the first value and the second value.

In an embodiment, the calculating the first value based on the plurality of jitter values may include calculating an average of the plurality of jitter values as the first value.

In an embodiment, the determining whether the common electrode has been unformed may include calculating a third value by dividing the second value by the first value.

In an embodiment, the determining whether the common electrode has been unformed may further include determining that the common electrode has been unformed, when the third value is greater than a predetermined value.

In an embodiment, the determining whether the common electrode has been unformed may further include determining that the common electrode is normal, when the third value is smaller than the predetermined value.

In an embodiment, the predetermined value may be 50.

In an embodiment, the electronic device testing method may further include providing a white signal to the plurality of data lines.

In an embodiment, the providing the white signal may be provided between the providing the electronic device and the measuring the plurality of jitter values.

BRIEF DESCRIPTION OF THE DRAWINGS

The above and other embodiments, advantages and features of the disclosure will become apparent by describing in detail embodiments thereof with reference to the accompanying drawings.

FIG. 10 is a table showing jitter values for respective channels, second values, and third values when a common electrode is normal.

FIG. 11 is a table showing jitter values for respective channels, second values, and third values when the common electrode has been unformed.

DETAILED DESCRIPTION

Figure 1:
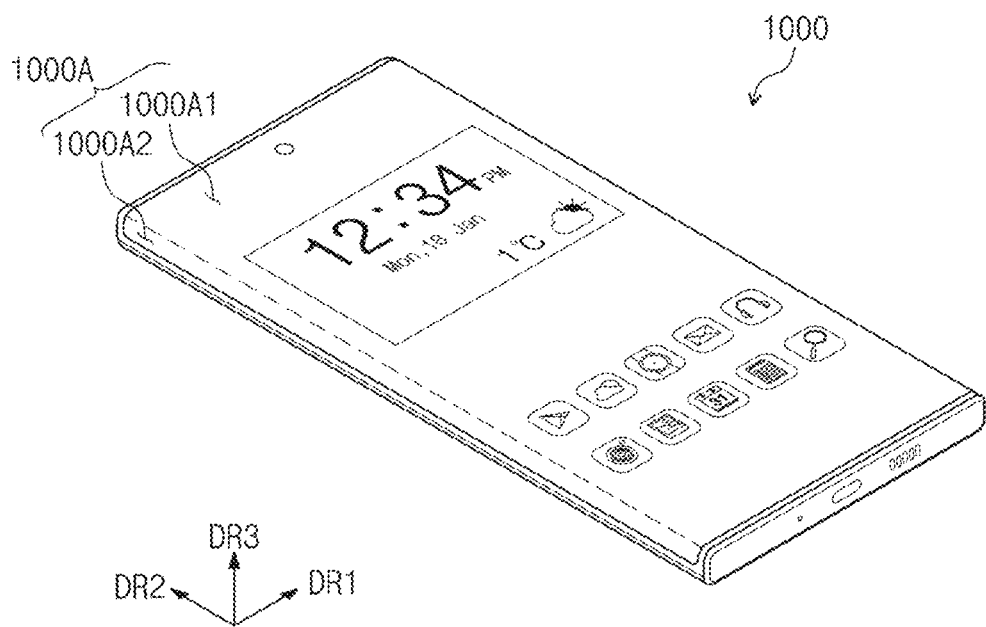
FIG. 1 is a perspective view of an embodiment of an electronic device according to the disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. Without departing the scope of the present disclosure, a first component may be referred to as a second component, and similarly, the second component may also be referred to as the first component, for example. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

The term "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

Hereinafter, embodiments of the disclosure will be described with reference to the accompanying drawings.

FIG. 1 is a perspective view of an embodiment of an electronic device according to the disclosure.

Referring to FIG. 1, the electronic device 1000 may include large electronic devices such as a television, a monitor, or a billboard. In addition, the electronic device (e.g., display device) 1000 may include small and medium-sized electronic devices such as a personal computer, a notebook computer, a personal digital terminal, a car navigation unit, a game machine, a smart phone, a tablet computer, or a camera. However, these are illustrative, and the electronic device 1000 may include other electronic devices without departing from the spirit and scope of the disclosure. In FIG. 1, the electronic device 1000 is illustrated as a mobile phone.

The electronic device 1000 may display an image through an active region 1000A. A first display surface 1000A1 parallel to a plane defined by a first direction DR1 and a second direction DR2 crossing the first direction DR1 and a second display surface 1000A2 extending from the first display surface A1 may be defined in the active region 1000A.

The second display surface 1000A2 may be bent from one side of the first display surface 1000A1. Furthermore, a plurality of second display surfaces 1000A2 may be provided. In this case, the second display surfaces 1000A2 may be bent from at least two sides of the first display surface 1000A1. One first display surface 1000A1 and up to four second display surfaces 1000A2 may be defined in the active region 1000A. However, the shape of the active region 1000A is not limited thereto, and only the first display surface 1000A1 may be defined in the active region 1000A.

The thickness direction of the electronic device 1000 may be parallel to a third direction DR3 crossing the first direction DR1 and the second direction DR2. Accordingly, front surfaces (or, upper surfaces) and rear surfaces (or, lower surfaces) of members constituting the electronic device 1000 may be defined based on the third direction DR3.

Figure 2:
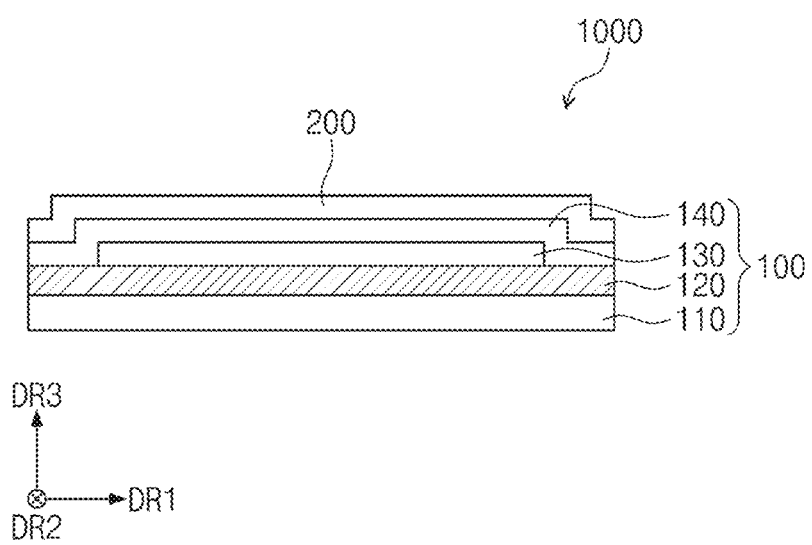
FIG. 2 is a cross-sectional view of an embodiment of the electronic device according to the disclosure.

FIG. 2 is a cross-sectional view of an embodiment of the electronic device according to the disclosure.

Referring to FIG. 2, the electronic device 1000 may include a display layer 100 and a sensor layer 200.

The display layer 100 in an embodiment of the disclosure may be an emissive display layer, but is not particularly limited thereto. In an embodiment, the display layer 100 may be an organic light-emitting display layer, a quantumdot display layer, a micro light-emitting diode ("LED") display layer, or a nano LED display layer, for example. The display layer 100 may include a base layer 110, a circuit layer 120, a light-emitting element layer 130, and an encapsulation layer 140.

The base layer 110 may be a member that provides a base surface on which the circuit layer 120 is disposed. The base layer 110 may be a glass substrate, a metal substrate, or a polymer substrate. However, without being limited thereto, the base layer 110 may be an inorganic layer, an organic layer, or a composite layer.

The base layer 110 may have a multi-layer structure. In an embodiment, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer, for example. The silicon oxide layer and the amorphous silicon layer may be also referred to as a base barrier layer.

Each of the first and second synthetic resin layers may include a polyimide-based resin. In an alternative embodiment, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. A term "—"-based resin used herein may refer to a resin including a "—" functional group.

The circuit layer 120 may be disposed on the base layer 110. The circuit layer 120 may include an insulating layer, a semiconductor pattern, a conductive pattern, and a signal line. The insulating layer, a semiconductor layer, and a conductive layer may be formed on the base layer 110 by a process such as coating or deposition and may be selectively subjected to patterning by performing a photolithography process a plurality of times. Thereafter, the semiconductor pattern, the conductive pattern, and the signal line included in the circuit layer 120 may be formed.

The light-emitting element layer 130 may be disposed on the circuit layer 120. The light-emitting element layer 130 may include light-emitting elements. In an embodiment, the light-emitting element layer 130 may include an organic light-emitting material, quantum dots, quantum rods, a micro-LED, or a nano-LED, for example.

The encapsulation layer 140 may be disposed on the light-emitting element layer 130. The encapsulation layer 140 may protect the light-emitting element layer 130 from foreign matter such as moisture, oxygen, and dust particles.

The sensor layer 200 may be formed on the display layer 100 through a continuous process. In this case, the sensor layer 200 may be expressed as being directly disposed on the display layer 100. When the sensor layer 200 is directly disposed on the display layer 100, it may mean that a third component is not disposed between the sensor layer 200 and the display layer 100. That is, a separate adhesive member may not be disposed between the sensor layer 200 and the display layer 100. In an alternative embodiment, the sensor layer 200 may be coupled with the display layer 100 through an adhesive member. The adhesive member may include a conventional adhesive or sticky substance.

Although not illustrated, a window member may be disposed on the sensor layer 200. The window member may be a component that protects internal components of the electronic device 1000 from external impact and substantially provides the active region 1000A of the electronic device 1000. In an embodiment, the window member may include a glass substrate, a sapphire substrate, or a plastic film, for example. The window member may have a multi-layer structure or a single-layer structure. In an embodiment, the window member may have a stacked structure of a plurality of plastic films coupled through an adhesive, or may have a stacked structure of a glass substrate and a plastic film coupled through an adhesive, for example.

Figure 3:
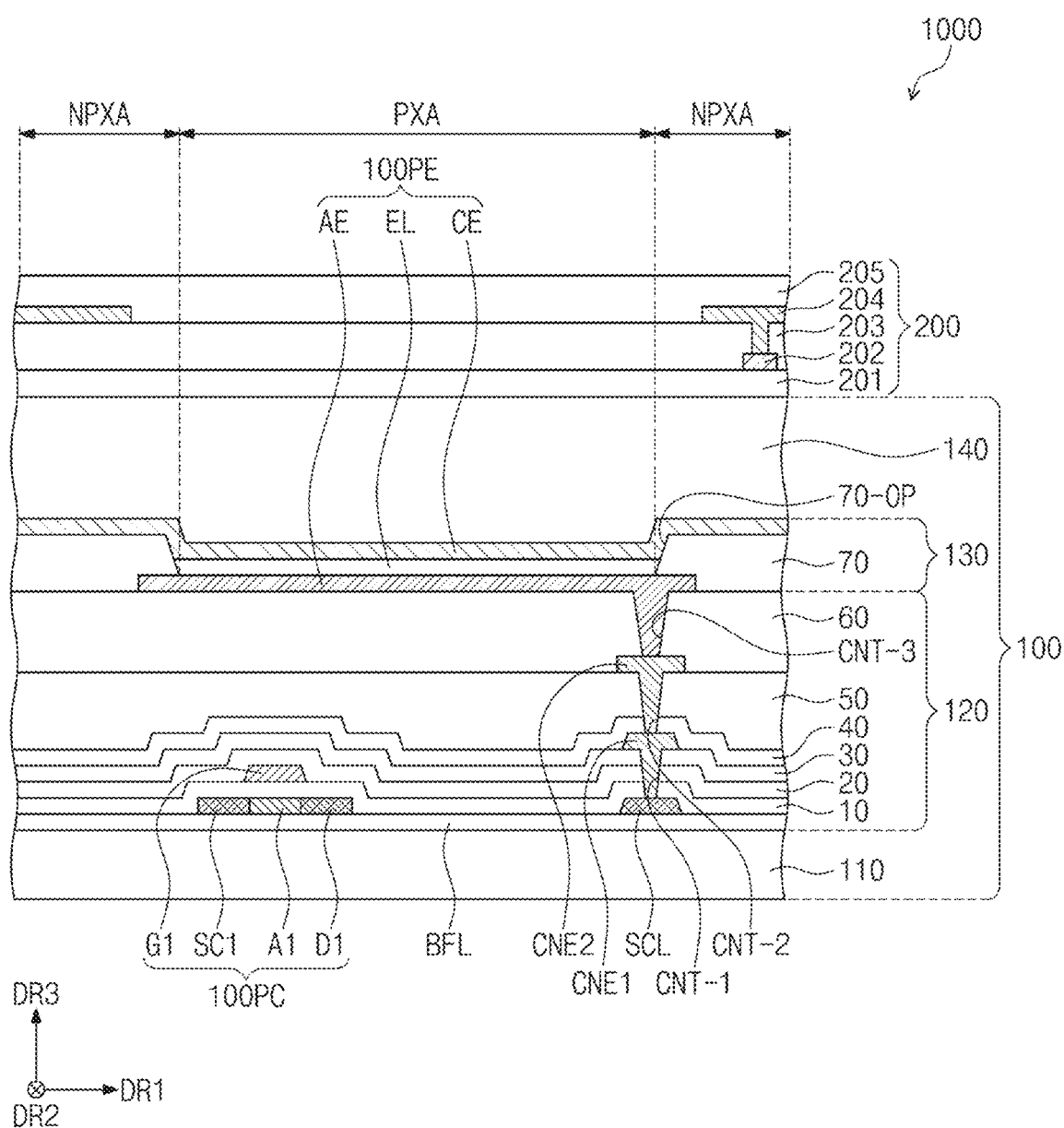
FIG. 3 is a cross-sectional view of an embodiment of the electronic device according to the disclosure.

FIG. 3 is a cross-sectional view of an embodiment of the electronic device according to the disclosure. In describing FIG. 3, the components described with reference to FIG. 2 will be assigned with identical reference numerals, and descriptions thereabout will be omitted.

Referring to FIG. 3, at least one inorganic layer may be formed on an upper surface of the base layer 110. The inorganic layer may include at least one of aluminum oxide, titanium oxide, silicon oxide, silicon oxy-nitride, zirconium oxide, and hafnium oxide. The inorganic layer may be formed in multiple layers. The multiple inorganic layers may constitute a barrier layer and/or a buffer layer. In this embodiment, the display layer 100 is illustrated as including a buffer layer BFL.

The buffer layer BFL may improve a coupling force between the base layer 110 and a semiconductor pattern. The buffer layer BFL may include silicon oxide layers and silicon nitride layers, and the silicon oxide layers and the silicon nitride layers may be alternately stacked one above another.

The semiconductor pattern may be disposed on the buffer layer BFL. The semiconductor pattern may include polysilicon. However, without being limited thereto, the semiconductor pattern may include amorphous silicon, low-temperature polycrystalline silicon, or oxide semiconductor.

FIG. 3 illustrates only a portion of the semiconductor pattern, and the semiconductor pattern may be additionally disposed in other regions. The semiconductor pattern may be arranged across pixels according to a predetermined rule. The semiconductor pattern may have different electrical properties depending on whether the semiconductor pattern is doped or not. The semiconductor pattern may include a first region having a relatively high conductivity and a second region having a relatively low conductivity. The first region may be doped with an N-type dopant or a P-type dopant. A P-type transistor may include a doped region doped with a P-type dopant, and an N-type transistor may include a doped region doped with an N-type dopant. The second region may be an undoped region, or may be a region more lightly doped than the first region.

The first region may have a higher conductivity than the second region and may substantially serve as an electrode or a signal line. The second region may substantially correspond to an active (or, channel) region of a transistor. In other words, a portion of the semiconductor pattern may be an active region of a transistor, another portion may be a source or drain of the transistor, and another portion may be a connecting electrode or a connecting signal line.

Each of the pixels may have an equivalent circuit including seven transistors, one capacitor, and a light-emitting element, and the equivalent circuit of the pixel may be modified in various forms. The pixels will be described below. In FIG. 3, one transistor 100PC and one light-emitting element 100PE that are included in a pixel are illustrated.

The transistor 100PC may include a source SC1, an active region A1, a drain D1, and a gate G1. The source SC1, the active region A1, and the drain D1 may be formed from the semiconductor pattern. The source SC1 and the drain D1 may extend from the active region A1 in opposite directions on the section. In FIG. 3, a portion of a connecting signal line SCL formed from the semiconductor pattern is illustrated. Although not separately illustrated, the connecting signal line SCL may be electrically connected to the drain D1 of the transistor 100PC in the plan view.

A first insulating layer 10 may be disposed on the buffer layer BFL. The first insulating layer 10 may commonly overlap a plurality of pixels and may cover the semiconductor pattern. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy-nitride, zirconium oxide, and hafnium oxide. In this embodiment, the first insulating layer 10 may be a single silicon oxide layer. Not only the first insulating layer 10 but also insulating layers of the circuit layer 120 to be described below may be inorganic layers and/or organic layers and may have a single-layer structure or a multi-layer structure. The inorganic layers may include at least one of the aforementioned materials, but are not limited thereto.

The gate G1 is disposed on the first insulating layer 10. The gate G1 may be a portion of a metal pattern. The gate G1 overlaps the active region A1. The gate G1 may function as a mask in a process of doping the semiconductor pattern.

A second insulating layer 20 may be disposed on the first insulating layer 10 and may cover the gate G1. The second insulating layer 20 may commonly overlap the pixels. The second insulating layer 20 may be an inorganic layer and/or an organic layer and may have a single-layer structure or a multi-layer structure. The second insulating layer 20 may include at least one of silicon oxide, silicon nitride, and silicon oxy-nitride. In this embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. In an embodiment, the third insulating layer 30 may have a multi-layer structure including a silicon oxide layer and a silicon nitride layer, for example.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a signal silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer and may cover the second connecting electrode CNE2. The sixth insulating layer may be an organic layer.

The light-emitting element layer 130 may be disposed on the circuit layer 120. The light-emitting element layer 130 may include the light-emitting element 100PE. In an embodiment, the light-emitting element layer 130 may include an organic light-emitting material, quantum dots, quantum rods, a micro-LED, or a nano-LED, for example.

Hereinafter, it will be exemplified that the light-emitting element 100PE is an organic light-emitting element. However, the disclosure is not particularly limited thereto.

The light-emitting element 100PE may include a first electrode AE, an emissive layer EL, and a second electrode CE. The first electrode AE may be disposed on the sixth insulating layer 60. The first electrode AE may be connected to the second connecting electrode CNE2 through a contact hole CNT-3 penetrating the sixth insulating layer 60.

A pixel defining film 70 may be disposed on the sixth insulating layer and may cover a portion of the first electrode AE. An opening 70-OP may be defined in the pixel defining film 70. The opening 70-OP of the pixel defining film 70 exposes at least a portion of the first electrode AE.

The active region 1000A (refer to FIG. 1) may include an emissive region PXA and a non-emissive region NPXA adjacent to the emissive region PXA. The non-emissive region NPXA may surround the emissive region PXA. In this embodiment, the emissive region PXA is defined to correspond to a partial region of the first electrode AE exposed through the opening 70-OP.

The emissive layer EL may be disposed on the first electrode AE. The emissive layer EL may be disposed in a region corresponding to the opening 70-OP. That is, the emissive layer EL may be separately formed for each of the pixels. When the emissive layer EL is separately formed for each of the pixels, the emissive layers EL may each emit at least one of blue light, red light, and green light. However, without being limited thereto, the emissive layer EL may be connected to the pixels and may be commonly provided. In this case, the emissive layer EL may provide blue light or white light.

The second electrode CE may be disposed on the emissive layer EL. The second electrode CE may have an integral shape and may be commonly disposed for the plurality of pixels. The second electrode CE may be also referred to as a common electrode CE.

Although not illustrated, a hole control layer may be disposed between the first electrode AE and the emissive layer EL. The hole control layer may be commonly disposed in the emissive region PXA and the non-emissive region NPXA. The hole control layer may include a hole transporting layer and may further include a hole injection layer. An electron control layer may be disposed between the emissive layer EL and the second electrode CE. The electron control layer may include an electron transporting layer and may further include an electron injection layer. The hole control layer and the electron control layer may be commonly formed for the plurality of pixels by an open mask.

The encapsulation layer 140 may be disposed on the light-emitting element layer 130. The encapsulation layer 140 may include an inorganic layer, an organic layer, and an inorganic layer sequentially stacked one above another. However, layers constituting the encapsulation layer 140 are not limited thereto.

The inorganic layers may protect the light-emitting element layer 130 from moisture and oxygen, and the organic layer may protect the light-emitting element layer 130 from foreign matter such as dust particles. The inorganic layers may include a silicon nitride layer, a silicon oxy-nitride layer, a silicon oxide layer, a titanium oxide layer, or an aluminum oxide layer. The organic layer may include, but is not limited to, an acrylate-based organic layer.

The sensor layer 200 may be formed on the display layer 100 through a continuous process. In this case, the sensor layer 200 may be expressed as being directly disposed on the display layer 100. When the sensor layer 200 is directly disposed on the display layer 100, it may mean that a third component is not disposed between the sensor layer 200 and the display layer 100. That is, a separate adhesive member may not be disposed between the sensor layer 200 and the display layer 100. In an alternative embodiment, the sensor layer 200 may be coupled to the display layer 100 through an adhesive member. The adhesive member may include a conventional adhesive or sticky substance.

The sensor layer 200 may include a base insulating layer 201, a first conductive layer 202, a sensing insulation layer 203, a second conductive layer 204, and a cover insulation layer 205.

The base insulating layer 201 may be an inorganic layer including at least one of silicon nitride, silicon oxy-nitride, and silicon oxide. In an alternative embodiment, the base insulating layer 201 may be an organic layer including an epoxy resin, an acrylic resin, or an imide-based resin. The base insulating layer 201 may have a single-layer structure, or may have a multi-layer structure stacked in the third direction DR3.

Each of the first conductive layer 202 and the second conductive layer 204 may have a single-layer structure, or may have a multi-layer structure stacked in the third direction DR3.

The conductive layer having the single-layer structure may include a metal layer or a transparent conductive layer. The metal layer may include molybdenum, silver, titanium, copper, aluminum, or any alloys thereof. The transparent conductive layer may include transparent conductive oxide such as indium tin oxide ("ITO"), indium zinc oxide ("IZO"), zinc oxide (ZnO), or indium zinc tin oxide ("IZTO"). In addition, the transparent conductive layer may include a conductive polymer such as poly(3,4-ethylenedioxythiophene) ("PEDOT"), a metal nano wire, or graphene.

The conductive layer having the multi-layer structure may include metal layers. The meal layers may have a three-layer structure of titanium/aluminum/titanium, for example. The conductive layer having the multi-layer structure may include at least one metal layer and at least one transparent conductive layer.

At least one of the sensing insulation layer 203 and the cover insulation layer 205 may include an inorganic film. The inorganic film may include at least one of aluminum oxide, titanium oxide, silicon oxide, silicon nitride, silicon oxy-nitride, zirconium oxide, and hafnium oxide.

At least one of the sensing insulation layer 203 and the cover insulation layer 205 may include an organic film. The organic film may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 4:
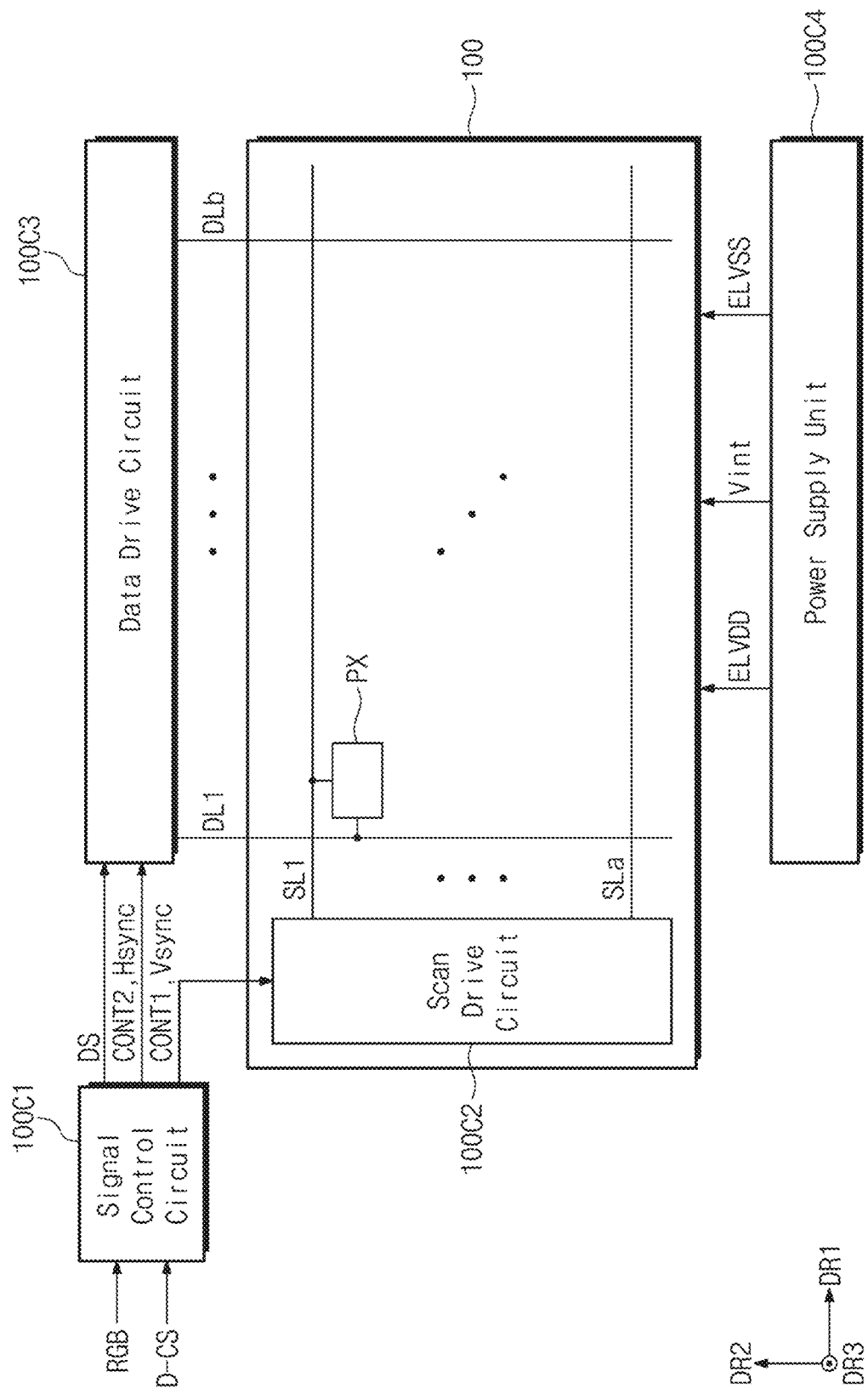
FIG. 4 is a block diagram of an embodiment of a display layer and drivers according to the disclosure.

FIG. 4 is a block diagram of an embodiment of the display layer and drivers according to the disclosure.

Referring to FIG. 4, the display layer 100 may include a plurality of scan lines SL1 to SLa, a plurality of data lines DL1 to DLb, and a plurality of pixels PX. Here, a and b are natural numbers. Each of the plurality of pixels PX may be connected with a corresponding data line among the plurality of data lines DL1 to DLb and may be connected with a corresponding scan line among the plurality of scan lines SL1 to SLa. In an embodiment of the disclosure, the display layer 100 may further include light emission control lines, and a display driver may further include a light emission drive circuit that provides control signals to light emission control lines. The configuration of the display layer 100 is not particularly limited.

The electronic device 1000 may further include a signal control circuit 100C1, a scan drive circuit 100C2, a data drive circuit 100C3, and a power supply unit 100C4.

The signal control circuit 100C1 may receive image data RGB and a control signal D-CS from a main controller. The control signal D-CS may include various signals. In an embodiment, the control signal D-CS may include an input vertical synchronization signal, an input horizontal synchronization signal, a main clock, and a data enable signal, for example.

The signal control circuit 100C1 may receive the image data RGB and the control signal D-CS. The control signal D-CS may include various signals. In an embodiment, the control signal D-CS may include an input vertical synchronization signal, an input horizontal synchronization signal, a main clock, and a data enable signal, for example.

The signal control circuit 100C1 may generate a first control signal CONT1 and a vertical synchronization signal Vsync based on the control signal D-CS and may output the first control signal CONT1 and the vertical synchronization signal Vsync to the scan drive circuit 100C2. In an embodiment, the vertical synchronization signal Vsync may be included in the first control signal CONT1.

The signal control circuit 100C1 may generate a second control signal CONT2 and a horizontal synchronization signal Hsync based on the control signal D-CS and may output the second control signal CONT2 and the horizontal synchronization signal Hsync to the data drive circuit 100C3. In an embodiment, the horizontal synchronization signal Hsync may be included in the second control signal CONT2.

Furthermore, the signal control circuit 100C1 may output, to the data drive circuit 100C3, a data signal DS obtained by processing the image data RGB according to an operating condition of the display layer 100. The first control signal CONT1 and the second control signal CONT2 are signals desired for operations of the scan drive circuit 100C2 and the data drive circuit 100C3 and are not particularly limited.

The scan drive circuit 100C2 may drive the plurality of scan lines SL1 to SLa in response to the first control signal CONT1 and the vertical synchronization signal Vsync. In an embodiment of the disclosure, the scan drive circuit 100C2 may be formed through the same process as the circuit layer 120 (refer to FIG. 3) in the display layer 100, but is not limited thereto. In an embodiment, the scan drive circuit 100C2 may be implemented with an integrated circuit ("IC") and may be directly disposed (e.g., mounted) on a predetermined region of the display layer 100, or may be disposed (e.g., mounted) on a separate printed circuit board in a chip on film ("COF") manner and may be electrically connected with the display layer 100, for example.

In response to the second control signal CONT2, the horizontal synchronization signal Hsync, and the data signal DS from the signal control circuit 100C1, the data drive circuit 100C3 may output gray voltages for driving the plurality of data lines DL1 to DLb. The data drive circuit 100C3 may be implemented with an integrated circuit and may be directly disposed (e.g., mounted) on a predetermined region of the display layer 100, or may be disposed (e.g., mounted) on a separate printed circuit board in a chip on film manner and may be electrically connected with the display layer 100. However, the data drive circuit 100C3 is not particularly limited. In an embodiment, the data drive circuit 100C3 may be formed through the same process as the circuit layer 120 (refer to FIG. 3) in the display layer 100, for example.

The power supply unit 100C4 may supply an external voltage to the display layer 100. The power supply unit 100C4 may supply first power ELVDD, second power ELVSS, and third power Vint to the plurality of pixels PX. The first power ELVDD may have a higher voltage level than the second power ELVSS. The third power Vint may be an initialization voltage that initializes the voltage of a gate electrode of a first transistor. The first power ELVDD may have a voltage of about 3 volts (V) to about 6V, and the second power ELVSS may have a voltage of about −7V to about 0V. However, this is illustrative, and the voltage ranges of the first power ELVDD and the second power ELVSS in an embodiment of the disclosure may have various voltage ranges capable of driving the display layer 100.

Figure 5:
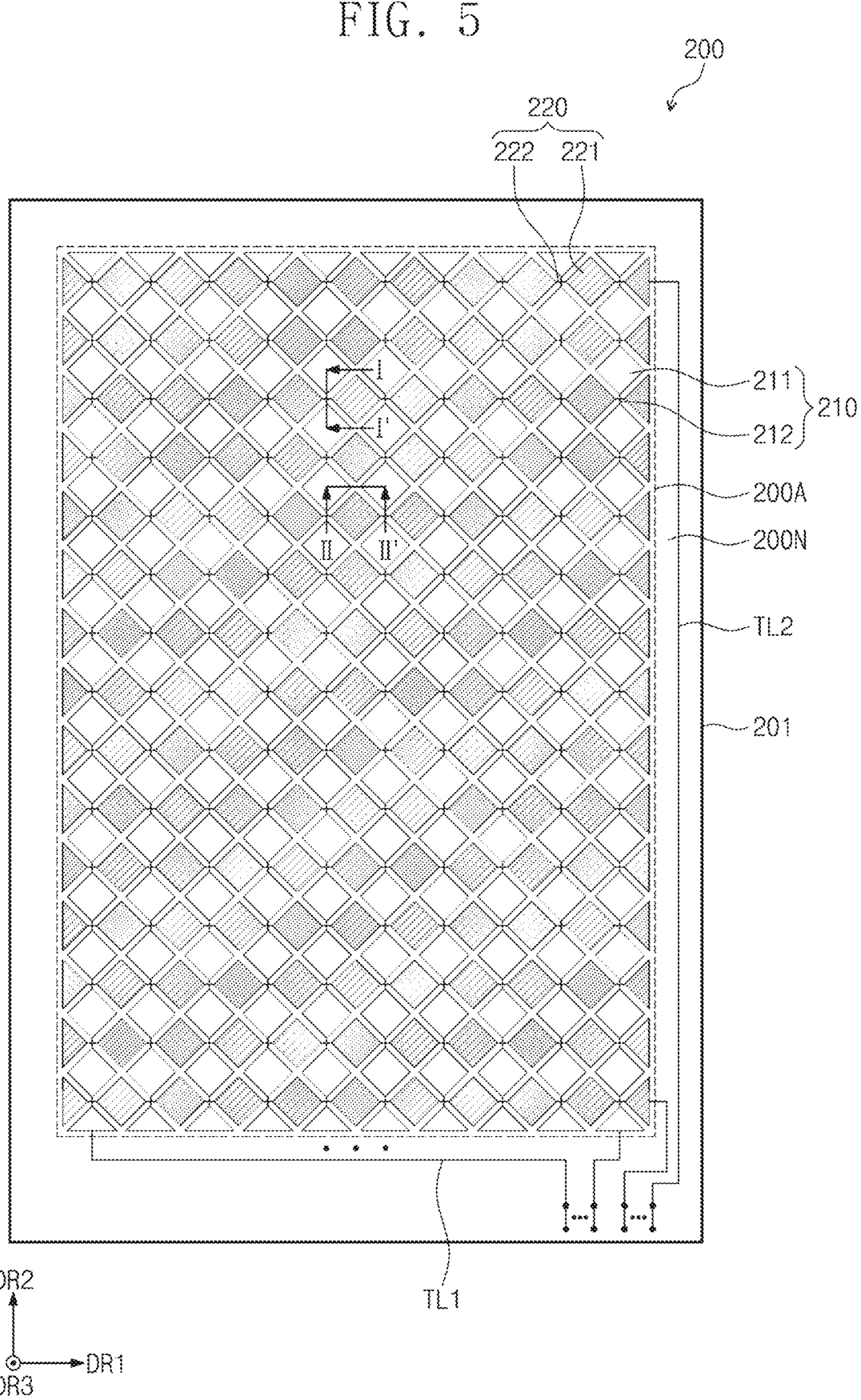
FIG. 5 is a plan view of an embodiment of a sensor layer according to the disclosure.

FIG. 5 is a plan view of an embodiment of the sensor layer according to the disclosure.

Referring to FIG. 5, an active region 200A and a peripheral region 200N surrounding the active region 200A may be defined in the sensor layer 200. The active region 200A may be a region activated in response to an electrical signal. In an embodiment, the active region 200A may be a region that senses an external input, for example. The active region 200A may overlap the active region 1000A (refer to FIG. 1) of the electronic device 1000 (refer to FIG. 1) in the plan view.

The sensor layer 200 may include the base insulating layer 201, a plurality of first electrodes 210, a plurality of second electrodes 220, and a plurality of sensing lines TL1 and TL2. The plurality of first electrodes 210 and the plurality of second electrodes 220 may be disposed in the active region 200A, and the plurality of sensing lines TL1 and TL2 may be disposed in the peripheral region 200N.

The plurality of first electrodes 210 may extend in the second direction DR2. The plurality of first electrodes 210 may be arranged in the first direction DR1. Each of the plurality of first electrodes 210 may include a plurality of sensing patterns 211 and a plurality of connecting patterns 212. Each of the plurality of connecting patterns 212 may electrically connect two sensing patterns 211 adjacent to each other. The plurality of sensing patterns 211 may have a mesh structure.

The plurality of second electrodes 220 may extend in the first direction DR1. The plurality of second electrodes 220 may be arranged in the second direction DR2. Each of the plurality of second electrodes 220 may include a plurality of first portions 221 and a plurality of second portions 222. Each of the plurality of second portions 222 may electrically connect two first portions 221 adjacent to each other. The plurality of first portions 221 and the plurality of second portions 222 may have a mesh structure.

Although FIG. 5 illustrates an embodiment that one connecting pattern 212 is connected to two sensing patterns 211 adjacent to each other, a connection relationship between the plurality of connecting patterns 212 and the plurality of sensing patterns 211 in an embodiment of the disclosure is not limited thereto. In an embodiment, two sensing patterns 211 adjacent to each other may be connected by two connecting patterns 212, for example.

The plurality of second portions 222 may be disposed in a different layer from the plurality of connecting patterns 212. The plurality of connecting patterns 212 may insulatively intersect the plurality of second electrodes 220. In an embodiment, the plurality of second portions 222 may insulatively intersect the plurality of connecting patterns 212, respectively, for example.

The first conductive layer 202 (refer to FIG. 3) may include the plurality of connecting patterns 212, and the second conductive layer 204 (refer to FIG. 3) may include the plurality of second electrodes 220 and the plurality of sensing patterns 211.

The plurality of sensing lines TL1 and TL2 may include a plurality of first sensing lines TL1 and a plurality of second sensing lines TL2.

The plurality of first sensing lines TL1 may be connected to the plurality of first electrodes 210, respectively. The plurality of second sensing lines TL2 may be connected to the plurality of second electrodes 220, respectively.

Figure 6:
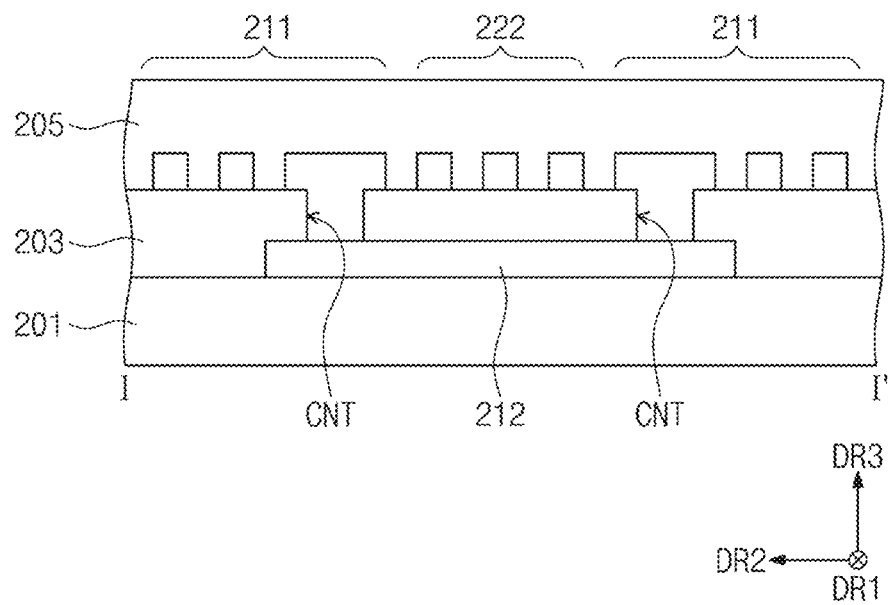
FIG. 6 is a cross-sectional view taken along line I-I' of FIG. 5 according to the disclosure.

FIG. 6 is a cross-sectional view taken along line I-I' of an embodiment of FIG. 5 according to the disclosure. In describing FIG. 6, the components described with reference to FIG. 3 will be assigned with identical reference numerals, and descriptions thereabout will be omitted.

Referring to FIGS. 5 and 6, the plurality of connecting patterns 212 may be disposed on the base insulating layer 201. The sensing insulation layer 203 may be disposed on the plurality of connecting patterns 212. The sensing insulation layer 203 may have a single-layer structure or a multi-layer structure. The sensing insulation layer 203 may include an inorganic material, an organic material, or a composite material.

The plurality of sensing patterns 211, the plurality of first portions 221, and the plurality of second portions 222 may be disposed on the sensing insulation layer 203. The plurality of sensing patterns 211, the plurality of first portions 221, and the plurality of second portions 222 may have a mesh structure.

A plurality of contact holes CNT may be defined through the sensing insulation layer 203 in the third direction DR3. Among the plurality of sensing patterns 211, two sensing patterns 211 adjacent to each other may be electrically connected with a connecting pattern 212 through the plurality of contact holes CNT.

The cover insulation layer 205 may be disposed on the plurality of sensing patterns 211, the plurality of first portions 221, and the plurality of second portions 222. The cover insulation layer 205 may have a single-layer structure or a multi-layer structure. The cover insulation layer 205 may include an inorganic material, an organic material, or a composite material.

Although FIG. 6 illustrates a bottom connection structure in which the plurality of connecting patterns 212 are disposed below the plurality of sensing patterns 211, the plurality of first portions 221, and the plurality of second portions 222, the disclosure is not limited thereto. In an embodiment, the sensor layer 200 may have a top connection structure in which the plurality of connecting patterns 212 are disposed above the plurality of sensing patterns 211, the plurality of first portions 221, and the plurality of second portions 222, for example.

Figure 7:
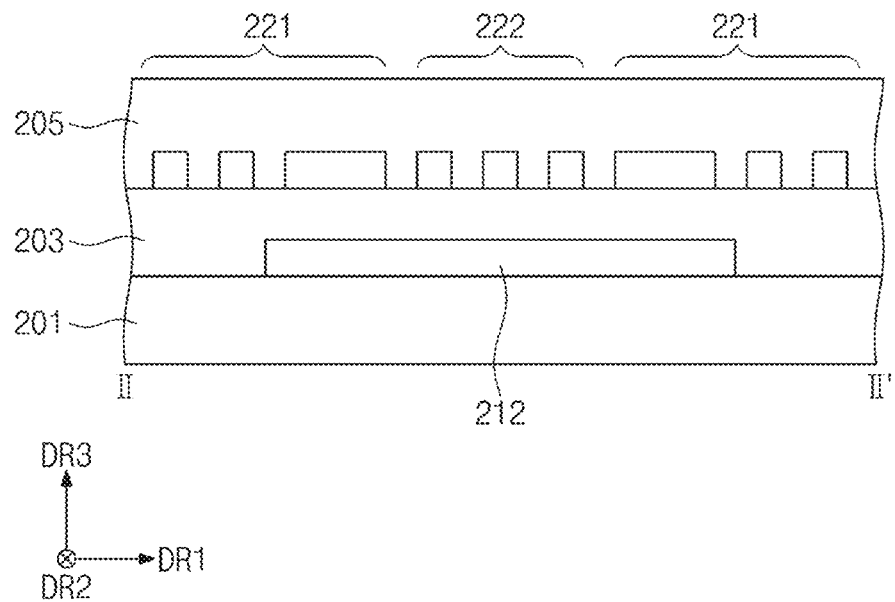
FIG. 7 is a cross-sectional view taken along line II-II' of FIG. 5 according to the disclosure.

FIG. 7 is a cross-sectional view taken along line II-II' of an embodiment of FIG. 5 according to the disclosure. In describing FIG. 7, the components described with reference to FIGS. 5 and 6 will be assigned with identical reference numerals, and descriptions thereabout will be omitted.

Referring to FIG. 7, the plurality of first portions 221 and the plurality of second portions 222 may be disposed above the plurality of connecting patterns 212. Each of the plurality of second portions 222 may connect two first portions 221 adjacent to each other. The plurality of first portions 221 and the plurality of second portions 222 may have a mesh structure.

Figure 8:
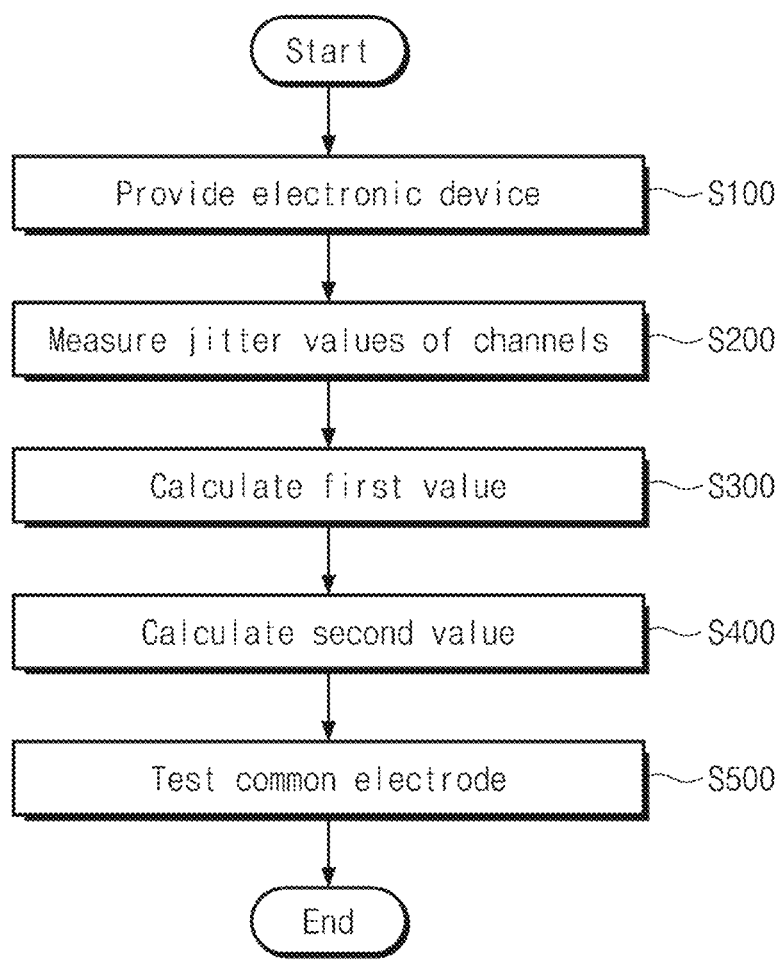
FIG. 8 is a flowchart of an embodiment of an electronic device testing method according to the disclosure.
Figure 9:
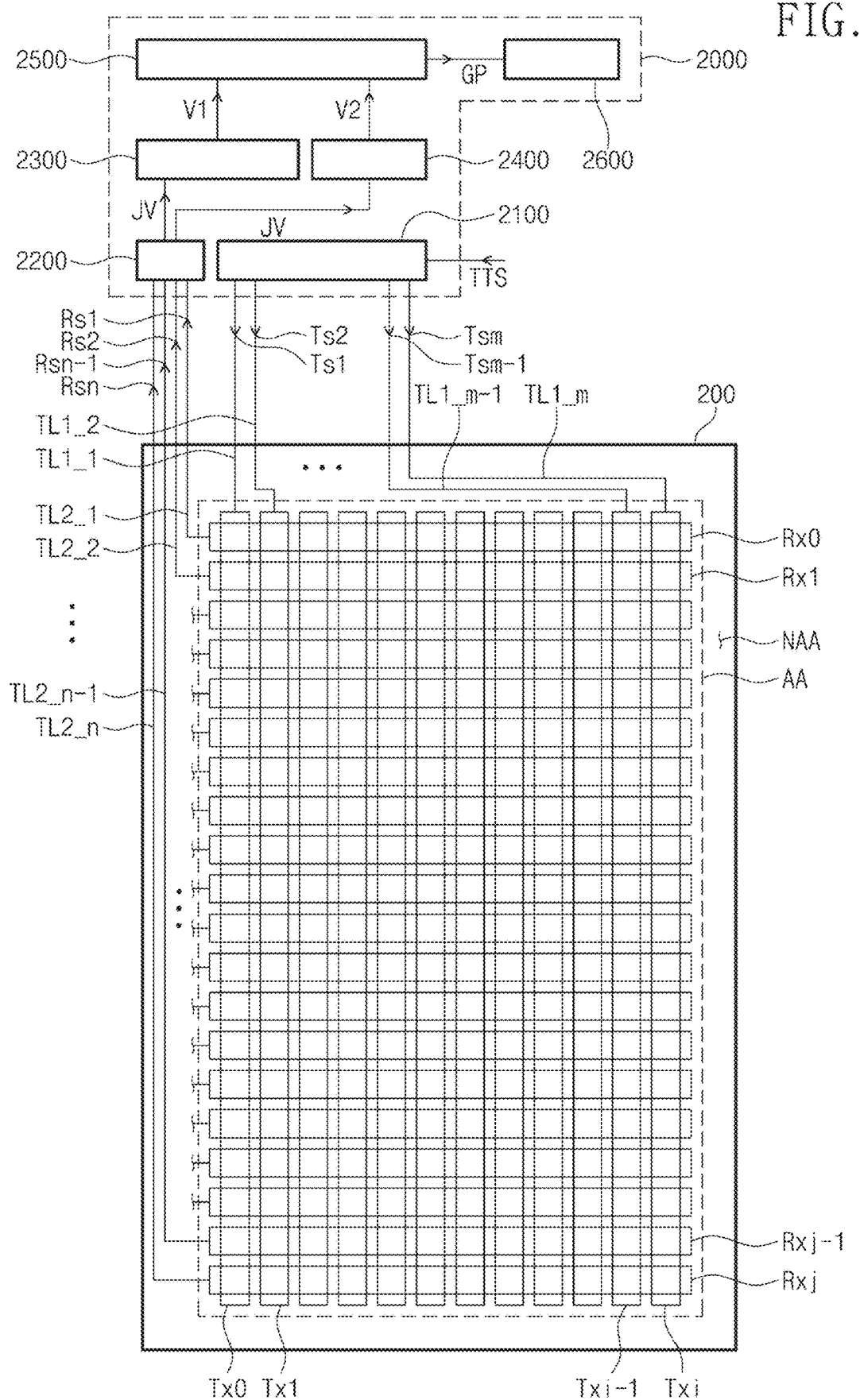
FIG. 9 is a conceptual diagram illustrating an embodiment of the sensor layer and an electronic device testing apparatus according to the disclosure.

FIG. 8 is a flowchart of an embodiment of an electronic device testing method according to the disclosure, and FIG. 9 is a conceptual diagram illustrating an embodiment of the sensor layer and an electronic device testing apparatus according to the disclosure. In describing FIG. 9, the components described with reference to FIG. 5 will be assigned with identical reference numerals, and descriptions thereabout will be omitted.

Referring to FIGS. 8 and 9, the electronic device 1000 (refer to FIG. 1) may be provided for a test of the common electrode CE (refer to FIG. 3) (S100).

The sensor layer 200 may include the plurality of first electrodes 210 (refer to FIG. 5), the plurality of second electrodes 220 (refer to FIG. 5), a plurality of first sensing lines TL1_1, TL1_2 to TL1_$m$-1, and TL1_$m$, and a plurality of second sensing lines TL2_1, TL2_2 to TL2_$n$-1, and TL2_$n$. In this case, "m" and "n" may be natural numbers.

The plurality of first electrodes 210 (refer to FIG. 5) may include a first first-electrode Tx0, a second first-electrode Tx1 to an $i^{th}$ first-electrode Txi-1, and an $(i+1)^{th}$ first-electrode Txi. In this case, "i" may be a natural number.

The plurality of second electrodes 220 (refer to FIG. 5) may include a first second-electrode Rx0, a second second-electrode Rx1 to a $j^{th}$ second-electrode Rxj-1, and a $(j+1)^{th}$ second-electrode Rxj. In this case, "j" may be a natural number. A plurality of channels formed by the plurality of first electrodes Tx0, Tx1 to Txi-1, and Txi and the plurality of second electrodes Rx0, Rx1 to Rxj-1, and Rxj may be defined in the sensor layer 200. In an embodiment, the first first-electrode Tx0 may form channels with the plurality of second electrodes Rx0, Rx1 to Rxj-1, and Rxj, and the second first-electrode Tx1 may also form channels with the plurality of second electrodes Rx0, Rx1 to Rxj-1, and Rxj, for example.

The plurality of first sensing lines TL1_1, TL1_2 to TL1_$m$-1, and TL1_$m$ may be electrically connected to first sides of the plurality of first electrodes Tx0, Tx1 to Txi-1, and Txi, respectively.

The plurality of second sensing lines TL2_1, TL2_2 to TL2_$n$-1, and TL2_$n$ may be electrically connected to first sides of the plurality of second electrodes Rx0, Rx1 to Rxj-1, and Rxj, respectively. However, the disclosure is not limited thereto. The sensor layer 200 in an embodiment of the disclosure may further include a plurality of third lines electrically connected to second sides of the plurality of first electrodes Tx0, Tx1 to Txi-1, and Txi, respectively, for example.

The sensor layer 200 of the electronic device 1000 (refer to FIG. 1) may be electrically connected with the electronic device testing apparatus 2000. The electronic device testing apparatus 2000 may be electrically connected with the plurality of first electrodes Tx0, Tx1 to Txi-1, and Txi and the plurality of second electrodes Rx0, Rx1 to Rxj-1, and Rxj. The electronic device testing apparatus 2000 may examine whether the common electrode CE (refer to FIG. 3) has been unformed.

When the electronic device 1000 (refer to FIG. 1) is tested, the data drive circuit 100C3 (refer to FIG. 4) may provide a display signal to the plurality of data lines DL1 to DLb. The display signal may include a white signal. The electronic device testing apparatus 2000 may test the display layer 100 (refer to FIG. 3) and the sensor layer 200 while the display layer 100 (refer to FIG. 3) operates. The white signal may be provided to the display layer 100 (refer to FIG. 3) before a plurality of jitter values JV are measured after the electronic device 1000 (refer to FIG. 1) is provided.

The electronic device testing apparatus 2000 may include a transmitter 2100, a receiver 2200, a first value calculation unit 2300, a second value calculation unit 2400, a third value calculation unit 2500, and a defect determination unit 2600.

The transmitter 2100 may receive a test signal TTS from the outside. When receiving the test signal TTS, the transmitter 2100 may transmit a plurality of test signals Ts1, Ts2 to Tsm-1, and Tsm to the first electrodes Tx0, Tx1 to Txi-1, and Txi.

The receiver 2200 may measure the plurality of jitter values JV of the plurality of channels formed by the plurality of first electrodes Tx0, Tx1 to Txi-1, and Txi and the plurality of second electrodes Rx0, Rx1 to Rxj-1, and Rxj (S200).

The receiver 2200 may receive, from the plurality of second electrodes Rx0, Rx1 to Rxj-1, and Rxj, a plurality of sensing signals Rs1, Rs2 to Rsn-1, and Rsn reflecting mutual capacitance between the plurality of first electrodes Tx0, Tx1 to Txi-1, and Txi and the plurality of second electrodes Rx0, Rx1 to Rxj-1, and Rxj. The receiver 2200 may output the jitter values JV of the respective channels, based on the mutual capacitance. The jitter values JV may be defined as predetermined numbers by measuring disturbance of the mutual capacitance.

The first value calculation unit 2300 may receive the plurality of jitter values JV from the receiver 2200. The first value calculation unit 2300 may calculate a first value V1, based on the plurality of jitter values JV (S300). The first value V1 may be the average of the plurality of jitter values JV.

The second value calculation unit 2400 may receive the plurality of jitter values JV from the receiver 2200. The second value calculation unit 2400 may calculate a second value V2, based on the plurality of jitter values JV (S400). The second value V2 may be the sum of jitter values of channels formed by one of the plurality of second electrodes Rx0, Rx1 to Rxj-1, and Rxj among the plurality of channels. That is, as many second values V2 as the plurality of second electrodes Rx0, Rx1 to Rxj-1, and Rxj may be calculated.

The third value calculation unit 2500 may receive the first value V1 from the first value calculation unit 2300 and may receive the second values V2 from the second value calculation unit 2400. The third value calculation unit 2500 may calculate third values V3 (refer to FIG. 10), based on the first value V1 and the second values V2. The third values V3 may be obtained by dividing the second values V2 by the first value V1. The third value calculation unit 2500 may output a graph GP including the third values V3.

The defect determination unit 2600 may receive the graph GP from the third value calculation unit 2500. The defect determination unit 2600 may test the common electrode CE (refer to FIG. 3), based on the graph GP (S500). When the third values V3 included in the graph GP are greater than a predetermined value, the defect determination unit 2600 may determine that the common electrode CE (refer to FIG. 3) is defective. When determining that the common electrode CE (refer to FIG. 3) is defective, the defect determination unit 2600 may determine that the common electrode CE (refer to FIG. 3) has been unformed.

FIG. 10 is a table showing jitter values for respective channels, second values, and third values when the common electrode is normal.

Referring to FIGS. 9 and 10, the plurality of channels formed by the plurality of first electrodes Tx0, Tx1 to Txi-1, and Txi and the plurality of second electrodes Rx0, Rx1 to Rxj-1, and Rxj are illustrated.

The plurality of first electrodes Tx0, Tx1 to Txi-1, and Txi may include a first first-electrode Tx0, a second first-electrode Tx1, a third first-electrode Tx2, a fourth first-electrode Tx3, a fifth first-electrode Tx4, a sixth first-electrode Tx5, a seventh first-electrode Tx6, an eighth first-electrode Tx7, a ninth first-electrode Tx8, a tenth first-electrode Tx9, an eleventh first-electrode Tx10, a twelfth first-electrode Tx11, a thirteenth first-electrode Tx12, a fourteenth first-electrode Tx13, a fifteenth first-electrode Tx14, and a sixteenth first-electrode Tx15. In FIG. 10, the sixteen first-electrodes are illustrated as one of embodiments.

The plurality of second electrodes Rx0, Rx1 to Rxj-1, and Rxj may include a nineteenth second-electrode Rx18, a twentieth second-electrode Rx19, a twenty-first second-electrode Rx20, a twenty-second second-electrode Rx21, a twenty-third second-electrode Rx22, a twenty-fourth second-electrode Rx23, a twenty-fifth second-electrode Rx24, a twenty-sixth second-electrode Rx25, a twenty-seventh second-electrode Rx26, a twenty-eighth second-electrode Rx27, a twenty-ninth second-electrode Rx28, a thirtieth second-electrode Rx29, a thirty-first second-electrode Rx30, a thirty-second second-electrode Rx31, a thirty-third second-electrode Rx32, a thirty-fourth second-electrode Rx33, a thirty-fifth second-electrode Rx34, and a thirty-sixth second-electrode Rx35. In FIG. 10, the eighteen second-electrodes are illustrated as one of embodiments.

A plurality of channels may be formed by the first first-electrode Tx0, the second first-electrode Tx1, the third first-electrode Tx2, the fourth first-electrode Tx3, the fifth first-electrode Tx4, the sixth first-electrode Tx5, the seventh first-electrode Tx6, the eighth first-electrode Tx7, the ninth first-electrode Tx8, the tenth first-electrode Tx9, the eleventh first-electrode Tx10, the twelfth first-electrode Tx11, the thirteenth first-electrode Tx12, the fourteenth first-electrode Tx13, the fifteenth first-electrode Tx14, and the sixteenth first-electrode Tx15 and the nineteenth second-electrode Rx18, the twentieth second-electrode Rx19, the twenty-first second-electrode Rx20, the twenty-second second-electrode Rx21, the twenty-third second-electrode Rx22, the twenty-fourth second-electrode Rx23, the twenty-fifth second-electrode Rx24, the twenty-sixth second-electrode Rx25, the twenty-seventh second-electrode Rx26, the twenty-eighth second-electrode Rx27, the twenty-ninth second-electrode Rx28, the thirtieth second-electrode Rx29, the thirty-first second-electrode Rx30, the thirty-second second-electrode Rx31, the thirty-third second-electrode Rx32, the thirty-fourth second-electrode Rx33, the thirty-fifth second-electrode Rx34, and the thirty-sixth second-electrode Rx35. The plurality of channels may include jitter values JV, respectively. In FIG. 10, jitter values JV for 288 channels are illustrated as one of embodiments.

The jitter values JV may be defined as predetermined numbers by measuring disturbance of the mutual capacitance. The predetermined numbers may range from 1 to 25, and the plurality of jitter values JV may range from 1 to 25.

When each of the plurality of jitter values JV has a lower value, it may mean that less jitter occurs in the cannel with the jitter value. When each of the plurality of jitter values JV has a higher value, it may mean that more jitter occurs in the cannel with the jitter value.

The jitter values JV of the plurality of channels may differ from one another due to an influence of a display signal provided to the display layer 100 (refer to FIG. 4). In an embodiment, the jitter value JV of the channel formed by the first first-electrode Tx0 and the thirty-sixth second-electrode Rx35 may be 6, for example. The jitter value JV of the channel formed by the second first-electrode Tx1 and the thirty-sixth second-electrode Rx35 may be 9. The jitter value JV of the channel formed by the third first-electrode Tx2 and the thirty-sixth second-electrode Rx35 may be 5. The jitter value JV of the channel formed by the fourth first-electrode Tx3 and the thirty-sixth second-electrode Rx35 may be 12. The jitter value JV of the channel formed by the fifth first-electrode Tx4 and the thirty-sixth second-electrode Rx35 may be 15. The jitter value JV of the channel formed by the sixth first-electrode Tx5 and the thirty-sixth second-electrode Rx35 may be 4. The jitter value JV of the channel formed by the seventh first-electrode Tx6 and the thirty-sixth second-electrode Rx35 may be 12. The jitter value JV of the channel formed by the eighth first-electrode Tx7 and the thirty-sixth second-electrode Rx35 may be 19. The jitter value JV of the channel formed by the ninth first-electrode Tx8 and the thirty-sixth second-electrode Rx35 may be 9. The jitter value JV of the channel formed by the tenth first-electrode Tx9 and the thirty-sixth second-electrode Rx35 may be 7. The jitter value JV of the channel formed by the eleventh first-electrode Tx10 and the thirty-sixth second-electrode Rx35 may be 7. The jitter value JV of the channel formed by the twelfth first-electrode Tx11 and the thirty-sixth second-electrode Rx35 may be 11. The jitter value JV of the channel formed by the thirteenth first-electrode Tx12 and the thirty-sixth second-electrode Rx35 may be 9. The jitter value JV of the channel formed by the fourteenth first-electrode Tx13 and the thirty-sixth second-electrode Rx35 may be 12. The jitter value JV of the channel formed by the fifteenth first-electrode Tx14 and the thirty-sixth second-electrode Rx35 may be 3. The jitter value JV of the channel formed by the sixteenth first-electrode Tx15 and the thirty-sixth second-electrode Rx35 may be 2.

The second value calculation unit 2400 may calculate the second value V2 by summing the jitter values of the channels formed by one of the plurality of second electrodes Rx0, Rx1 to Rxj-1, and Rxj among the plurality of channels. In this case, the second value V2 calculated based on the thirty-sixth second-electrode Rx35 may be 142.

In an embodiment, the second value V2 calculated based on the thirty-fifth second-electrode Rx34 may be 143, for example. The second value V2 calculated based on the thirty-fourth second-electrode Rx33 may be 144. The second value V2 calculated based on the thirty-third second-electrode Rx32 may be 87. The second value V2 calculated based on the thirty-second second-electrode Rx31 may be 61. The second value V2 calculated based on the thirty-first second-electrode Rx30 may be 41. The second value V2 calculated based on the thirtieth second-electrode Rx29 may be 46. The second value V2 calculated based on the twenty-ninth second-electrode Rx28 may be 44. The second value V2 calculated based on the twenty-eighth second-electrode Rx27 may be 49. The second value V2 calculated based on the twenty-seventh second-electrode Rx26 may be 59. The second value V2 calculated based on the twenty-sixth second-electrode Rx25 may be 55. The second value V2 calculated based on the twenty-fifth second-electrode Rx24 may be 58. The second value V2 calculated based on the twenty-fourth second-electrode Rx23 may be 54. The second value V2 calculated based on the twenty-third second-electrode Rx22 may be 54. The second value V2 calculated based on the twenty-second second-electrode Rx21 may be 42. The second value V2 calculated based on the twenty-first second-electrode Rx20 may be 40. The second value V2 calculated based on the twentieth second-electrode Rx19 may be 43. The second value V2 calculated based on the nineteenth second-electrode Rx18 may be 43.

The third value calculation unit 2500 may calculate the third values V3 by dividing the second values V2 by the first value V1. In this case, the third value V3 calculated based on the second value V2 of the thirty-sixth second-electrode Rx35 may be 33.94.

In an embodiment, the third value V3 calculated based on the thirty-fifth second-electrode Rx34 may be 36.59. The third value V3 calculated based on the thirty-fourth second-electrode Rx33 may be 40.07, for example. The third value V3 calculated based on the thirty-third second-electrode Rx32 may be 26.91. The third value V3 calculated based on the thirty-second second-electrode Rx31 may be 19.83. The third value V3 calculated based on the thirty-first second-electrode Rx30 may be 13.58. The third value V3 calculated based on the thirtieth second-electrode Rx29 may be 15.05. The third value V3 calculated based on the twenty-ninth second-electrode Rx28 may be 14.31. The third value V3 calculated based on the twenty-eighth second-electrode Rx27 may be 15.77. The third value V3 calculated based on the twenty-seventh second-electrode Rx26 may be 18.96. The third value V3 calculated based on the twenty-sixth second-electrode Rx25 may be 18.10. The third value V3 calculated based on the twenty-fifth second-electrode Rx24 may be 19.45. The third value V3 calculated based on the twenty-fourth second-electrode Rx23 may be 18.78. The third value V3 calculated based on the twenty-third second-electrode Rx22 may be 19.46. The third value V3 calculated based on the twenty-second second-electrode Rx21 may be 16.00. The third value V3 calculated based on the twenty-first second-electrode Rx20 may be 15.24. The third value V3 calculated based on the twentieth second-electrode Rx19 may be 16.00. The third value V3 calculated based on the nineteenth second-electrode Rx18 may be 16.00.

The third value calculation unit 2500 may output the graph GP based on the plurality of calculated third values V3.

The defect determination unit 2600 may determine whether the common electrode CE (refer to FIG. 3) is defective, based on the graph GP.

FIG. 11 is a table showing jitter values for respective channels, second values, and third values when the common electrode has been unformed. In describing FIG. 11, the components described with reference to FIG. 10 will be assigned with identical reference numerals, and descriptions thereabout will be omitted.

Referring to FIGS. 9 and 11, the plurality of channels formed by the plurality of first electrodes Tx0, Tx1 to Txi-1, and Txi and the plurality of second electrodes Rx0, Rx1 to Rxj-1, and Rxj are illustrated.

In FIG. 11, 16 first electrodes, 18 second electrodes, and jitter values JV for 288 channels are illustrated as an embodiment as in FIG. 10.

In an embodiment, the jitter value JV of the channel formed by the first first-electrode Tx0 and the thirty-fifth second-electrode Rx34 may be 9, for example. The jitter value JV formed by the second first-electrode Tx1 and the thirty-fifth second-electrode Rx34 may be 17. The jitter value JV formed by the third first-electrode Tx2 and the thirty-fifth second-electrode Rx34 may be 9. The jitter value JV formed by the fourth first-electrode Tx3 and the thirty-fifth second-electrode Rx34 may be 10. The jitter value JV formed by the fifth first-electrode Tx4 and the thirty-fifth second-electrode Rx34 may be 15. The jitter value JV formed by the sixth first-electrode Tx5 and the thirty-fifth second-electrode Rx34 may be 13. The jitter value JV formed by the seventh first-electrode Tx6 and the thirty-fifth second-electrode Rx34 may be 10. The jitter value JV formed by the eighth first-electrode Tx7 and the thirty-fifth second-electrode Rx34 may be 11. The jitter value JV formed by the ninth first-electrode Tx8 and the thirty-fifth second-electrode Rx34 may be 14. The jitter value JV formed by the tenth first-electrode Tx9 and the thirty-fifth second-electrode Rx34 may be 12. The jitter value JV formed by the eleventh first-electrode Tx10 and the thirty-fifth second-electrode Rx34 may be 17. The jitter value JV formed by the twelfth first-electrode Tx11 and the thirty-fifth second-electrode Rx34 may be 14. The jitter value JV formed by the thirteenth first-electrode Tx12 and the thirty-fifth second-electrode Rx34 may be 12. The jitter value JV formed by the fourteenth first-electrode Tx13 and the thirty-fifth second-electrode Rx34 may be 12. The jitter value JV formed by the fifteenth first-electrode Tx14 and the thirty-fifth second-electrode Rx34 may be 15. The jitter value JV formed by the sixteenth first-electrode Tx15 and the thirty-fifth second-electrode Rx34 may be 8.

The second value calculation unit 2400 may calculate the second value V2 by summing the jitter values of the channels formed by one of the plurality of second electrodes Rx0, Rx1 to Rxj-1, and Rxj among the plurality of channels. In this case, the second value V2 calculated based on the thirty-fifth second-electrode Rx34 may be 198.

In an embodiment, the second value V2 calculated based on the thirty-sixth second-electrode Rx35 may be 38, for example. The second value V2 calculated based on the thirty-fourth second-electrode Rx33 may be 49. The second value V2 calculated based on the thirty-third second-electrode Rx32 may be 38. The second value V2 calculated based on the thirty-second second-electrode Rx31 may be 32. The second value V2 calculated based on the thirty-first second-electrode Rx30 may be 30. The second value V2 calculated based on the thirtieth second-electrode Rx29 may be 30. The second value V2 calculated based on the twenty-ninth second-electrode Rx28 may be 31. The second value V2 calculated based on the twenty-eighth second-electrode Rx27 may be 33. The second value V2 calculated based on the twenty-seventh second-electrode Rx26 may be 30. The second value V2 calculated based on the twenty-sixth second-electrode Rx25 may be 30. The second value V2 calculated based on the twenty-fifth second-electrode Rx24 may be 32. The second value V2 calculated based on the twenty-fourth second-electrode Rx23 may be 34. The second value V2 calculated based on the twenty-third second-electrode Rx22 may be 36. The second value V2 calculated based on the twenty-second second-electrode Rx21 may be 32. The second value V2 calculated based on the twenty-first second-electrode Rx20 may be 32. The second value V2 calculated based on the twentieth second-electrode Rx19 may be 31. The second value V2 calculated based on the nineteenth second-electrode Rx18 may be 31.

The third value calculation unit 2500 may calculate the third values V3 by dividing the second values V2 by the first value V1. In this case, the third value V3 calculated based on the second value V2 of the thirty-fifth second-electrode Rx34 may be 73.88.

In an embodiment, the third value V3 calculated based on the thirty-sixth second-electrode Rx35 may be 14.27, for example. The third value V3 calculated based on the thirty-fourth second-electrode Rx33 may be 23.62. The third value V3 calculated based on the thirty-third second-electrode Rx32 may be 18.92. The third value V3 calculated based on the thirty-second second-electrode Rx31 may be 16.14. The third value V3 calculated based on the thirty-first second-electrode Rx30 may be 15.15. The third value V3 calculated based on the thirtieth second-electrode Rx29 may be 15.08. The third value V3 calculated based on the twenty-ninth second-electrode Rx28 may be 15.50. The third value V3 calculated based on the twenty-eighth second-electrode Rx27 may be 16.45. The third value V3 calculated based on the twenty-seventh second-electrode Rx26 may be 15.00. The third value V3 calculated based on the twenty-sixth second-electrode Rx25 may be 14.88. The third value V3 calculated based on the twenty-fifth second-electrode Rx24 may be 15.72. The third value V3 calculated based on the twenty-fourth second-electrode Rx23 may be 16.65. The third value V3 calculated based on the twenty-third second-electrode Rx22 may be 17.78. The third value V3 calculated based on the twenty-second second-electrode Rx21 may be 16.25. The third value V3 calculated based on the twenty-first second-electrode Rx20 may be 16.34. The third value V3 calculated based on the twentieth second-electrode Rx19 may be 16.00. The third value V3 calculated based on the nineteenth second-electrode Rx18 may be 16.00.

The third value calculation unit 2500 may output the graph GP based on the plurality of calculated third values V3.

The defect determination unit 2600 may determine whether the common electrode CE (refer to FIG. 3) is defective, based on the graph GP.

When the common electrode CE (refer to FIG. 3) has been unformed, a display signal provided to the display layer 100 (refer to FIG. 4) through the unformed portion may interfere with a second electrode overlapping the unformed portion among the plurality of second electrodes 220 (refer to FIG. 5). Although FIG. 11 illustrates an embodiment in which the thirty-fifth second-electrode Rx34 overlaps the unformed portion, the disclosure is not limited thereto.

The jitter values JV measured in the channels formed by the thirty-fifth second-electrode Rx34 may be greater than jitter values measured in channels formed by another second electrode.

According to the disclosure, when the common electrode CE (refer to FIG. 3) has been unformed, jitter values JV measured in channels that a predetermined second electrode among the plurality of second electrodes 220 (refer to FIG. 5) forms with the plurality of first electrodes 210 (refer to FIG. 5) may be greater than jitter values measured in adjacent channels. Based on this, the defect determination unit 2600 may easily determine whether the common electrode CE (refer to FIG. 3) has been unformed. Accordingly, the electronic device testing method having improved reliability may be provided.

Figure 12:
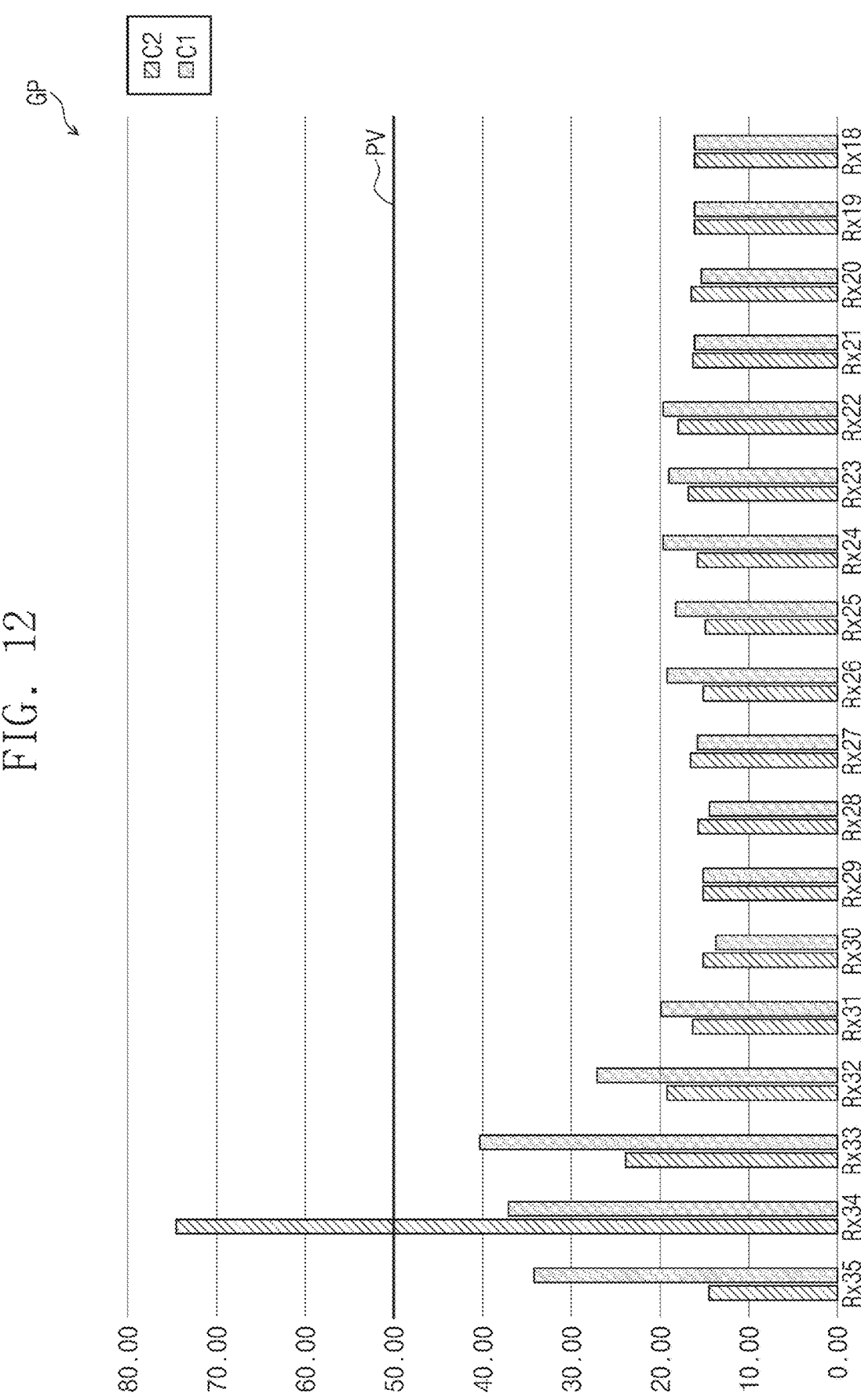
FIG. 12 is a graph output by a third value calculation unit based on the third values calculated in FIGS. 10 and 11.

FIG. 12 is a graph output by the third value calculation unit based on the third values calculated in FIGS. 10 and 11.

Referring to FIGS. 9 to 12, the horizontal axis of the graph GP may represent the second electrodes 220 (refer to FIG. 5). In FIG. 12, the nineteenth to thirty-sixth second-electrodes Rx18 to Rx35 are illustrated on the horizontal axis.

The vertical axis of the graph GP may represent the third values V3. The graph GP may include a first graph C1 and a second graph C2.

The first graph C1 depicts the plurality of third values V3 calculated in FIG. 10. The second graph C2 depicts the plurality of third values V3 calculated in FIG. 11.

When the third values V3 are greater than a predetermined value (PV in FIG. 12), the defect determination unit 2600 may determine that the common electrode CE (refer to FIG. 3) is defective. When the third values V3 are smaller than the predetermined value, the defect determination unit 2600 may determine that the common electrode CE (refer to FIG. 3) is a good product.

The predetermined value may have a value of 40 to 70. In an embodiment, the predetermined value may be 50, for example. However, this is illustrative, and the predetermined value in an embodiment of the disclosure may be diversely provided depending on the type of the electronic device 1000 (refer to FIG. 1).

In the graph GP, the third values V3 of the first graph C1 may be smaller than the predetermined value.

The defect determination unit 2600 may determine that the common electrode CE (refer to FIG. 3) of the electronic device 1000 (refer to FIG. 1) of the first graph C1 is normal.

In the graph GP, the third value V3 of the second graph C2 measured based on the thirty-fifth second-electrode Rx34 may have a value of 73.88 greater than the predetermined value of 50.

The defect determination unit 2600 may determine that the common electrode CE (refer to FIG. 3) of the electronic device 1000 (refer to FIG. 1) of the second graph C2 has been unformed.

According to the disclosure, when the common electrode CE (refer to FIG. 3) has been unformed, jitter values JV measured in channels that a predetermined second electrode among the plurality of second electrodes 220 (refer to FIG. 5) forms with the plurality of first electrodes 210 (refer to FIG. 5) may be greater than jitter values measured in adjacent channels. Based on this, the defect determination unit 2600 may easily determine whether the common electrode CE (refer to FIG. 3) has been unformed. Accordingly, the electronic device testing method having improved reliability may be provided.

As described above, when the common electrode has been unformed, jitter values measured in channels that a predetermined second electrode among the plurality of second electrodes forms with the plurality of first electrodes may be greater than jitter values measured in adjacent channels. Based on this, whether the common electrode has been unformed may be easily determined. Accordingly, the electronic device testing method having improved reliability may be provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An electronic device testing method comprising:
providing an electronic device including:
a display layer including a common electrode; and
a sensor layer disposed on the display layer and including a plurality of first electrodes and a plurality of second electrodes which insulatively intersect the plurality of first electrodes;
measuring a plurality of jitter values of a plurality of channels formed by the plurality of first electrodes and the plurality of second electrodes;
calculating a first value being an average of the plurality of jitter values;
calculating a second value by summing jitter values, among the plurality of jitter values, of channels formed by one of the plurality of second electrodes among the plurality of channels; and
testing the common electrode based on a third value obtained by dividing the second value by the first value.

2. The electronic device testing method of claim 1, wherein the testing the common electrode includes determining that the common electrode is defective, when the third value is greater than a predetermined value.

3. The electronic device testing method of claim 2, wherein the testing the common electrode further includes determining that the common electrode is a good product, when the third value is smaller than the predetermined value.

4. The electronic device testing method of claim 3, wherein the predetermined value is 50.

5. The electronic device testing method of claim 1, wherein each of the plurality of jitter values has a value of 1 to 25.

6. The electronic device testing method of claim 1, wherein the testing the common electrode includes determining whether the common electrode has been unformed.

7. The electronic device testing method of claim 1, wherein the display layer further includes a plurality of data lines.

8. The electronic device testing method of claim 7, further comprising:
providing a white signal to the plurality of data lines.

9. The electronic device testing method of claim 8, wherein the providing the white signal is provided between the providing the electronic device and the measuring the plurality of jitter values.

10. The electronic device testing method of claim 1, wherein the plurality of first electrodes includes a plurality of sensing patterns arranged in a first direction and a connecting pattern which connects two sensing patterns adjacent to each other among the plurality of sensing patterns, and
wherein the plurality of second electrodes includes a plurality of first portions arranged in a second direction crossing the first direction and a second portion which connects two first portions adjacent to each other among the plurality of first portions.

11. The electronic device testing method of claim 10, wherein the connecting pattern and the second portion are disposed in different layers.

12. The electronic device testing method of claim 1, wherein the measuring the plurality of jitter values includes:
providing a test signal to the plurality of first electrodes;
sensing mutual capacitance from the plurality of second electrodes; and
sensing the plurality of jitter values based on the mutual capacitance.

13. An electronic device testing method comprising:
providing an electronic device including:
a display layer including a common electrode and a plurality of data lines; and
a sensor layer disposed on the display layer and including a plurality of first electrodes and a plurality of second electrodes which insulatively intersect the plurality of first electrodes;
measuring a plurality of jitter values of a plurality of channels formed by the plurality of first electrodes and the plurality of second electrodes;
calculating a first value based on the plurality of jitter values;
calculating a second value by summing jitter values, among the plurality of jitter values, of channels formed by one of the plurality of second electrodes among the plurality of channels; and
determining whether the common electrode has been unformed, based on the first value and the second value.

14. The electronic device testing method of claim 13, wherein the calculating the first value based on the plurality of jitter values includes calculating an average of the plurality of jitter values as the first value.

15. The electronic device testing method of claim 13, wherein the determining whether the common electrode has been unformed includes calculating a third value by dividing the second value by the first value.

16. The electronic device testing method of claim 15, wherein the determining whether the common electrode has been unformed further includes determining that the common electrode has been unformed, when the third value is greater than a predetermined value.

17. The electronic device testing method of claim 16, wherein the determining whether the common electrode has been unformed further includes determining that the common electrode is normal, when the third value is smaller than the predetermined value.

18. The electronic device testing method of claim 17, wherein the predetermined value is 50.

19. The electronic device testing method of claim 13, further comprising:
providing a white signal to the plurality of data lines.

20. The electronic device testing method of claim 19, wherein the providing the white signal is provided between the providing the electronic device and the measuring the plurality of jitter values.

* * * * *